(12) United States Patent
Ansell et al.

(10) Patent No.: US 12,331,863 B2
(45) Date of Patent: *Jun. 17, 2025

(54) TUBE COUPLING

(71) Applicant: RELIANCE WORLDWIDE CORPORATION (UK) LIMITED, West Drayton Middlesex (GB)

(72) Inventors: Glen Ansell, Edgware Middlesex (GB); Joshua Smith, West Drayton Middlesex (GB)

(73) Assignee: Reliance Worldwide Corporation (UK) Limited, Middlesex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,240

(22) Filed: Mar. 6, 2024

(65) Prior Publication Data

US 2024/0209970 A1  Jun. 27, 2024

Related U.S. Application Data

(63) Continuation of application No. 17/560,805, filed on Dec. 23, 2021, now Pat. No. 11,976,759, which is a
(Continued)

(30) Foreign Application Priority Data

| Jul. 10, 2019 | (GB) | 1909903 |
| Jul. 10, 2019 | (GB) | 1909906 |
| Jul. 10, 2019 | (GB) | 1909909 |

(51) Int. Cl.
*F16L 21/00* (2006.01)
*F16L 33/03* (2006.01)
*F16L 33/035* (2006.01)

(52) U.S. Cl.
CPC ............. *F16L 33/03* (2013.01); *F16L 33/035* (2013.01)

(58) Field of Classification Search
CPC . F16L 33/00; F16L 33/22; F16L 33/24; F16L 33/245; F16L 21/00; F16L 21/002;
(Continued)

(56) References Cited

U.S. PATENT DOCUMENTS 5,078,432 A    1/1992 Seiter
5,141,261 A *  8/1992 Ziu ....................... F16L 39/005
                                                        285/123.1
(Continued)

FOREIGN PATENT DOCUMENTS

CN        1865799 A    11/2006
CN      101047023 A    10/2007
(Continued)

OTHER PUBLICATIONS

Office Action; Chinese Patent Application No. 202080063452.8; Apr. 4, 2023.
(Continued)

*Primary Examiner* — Aaron M Dunwoody
(74) *Attorney, Agent, or Firm* — Barnes & Thornburg LLP

(57) ABSTRACT

A tube coupling having a coupling body with an opened ended throughway to receive a tube. A collet located in the open end of the through way has a ring and flexible arms extending generally axially of the ring into the throughway. The throughway has a tapered surface convergent towards the open end and the collet arms have heads at their distal ends for engaging both of the tapered surface and a tube extending through the collet. A collet lock is formed on the collet, the collet having a locked rotary position and an unlocked rotary position. One of the body and the collet is
(Continued)

provided with a cam surface and the other is provided with a cam follower, the cam surface being provided to provide the locked and unlocked positions. The disclosure also extends to the collet.

41 Claims, 12 Drawing Sheets

Related U.S. Application Data continuation of application No. PCT/EP2020/069228, filed on Jul. 8, 2020, and a continuation of application No. PCT/EP2020/069089, filed on Jul. 7, 2020, and a continuation of application No. PCT/GB2019/053602, filed on Dec. 18, 2019.

(58) Field of Classification Search
CPC . F16L 25/12; F16L 31/00; F16L 39/00; F16L 39/005; F16L 39/02; F16L 47/00; F16L 47/06; F16L 47/20
See application file for complete search history.

(56) References Cited

U.S. PATENT DOCUMENTS

| | | | | |
|---|---|---|---|---|
| 5,400,828 | A * | 3/1995 | Ziu | F16L 39/00 138/113 |
| 5,832,158 | A | 11/1998 | Chen | |
| 6,053,639 | A | 4/2000 | Chen | |
| 6,517,124 | B1 | 2/2003 | Le Quere | |
| 7,543,858 | B1 | 6/2009 | Wang | |
| 7,558,457 | B2 | 7/2009 | Choi et al. | |
| 2002/0163191 | A1 | 11/2002 | Muenster et al. | |
| 2002/0195123 | A1* | 12/2002 | Strait | G02B 6/3866 15/210.1 |
| 2006/0151995 | A1* | 7/2006 | Saarem | F16L 33/213 285/369 |
| 2007/0242505 | A1 | 10/2007 | Ochiai et al. | |
| 2008/0145000 | A1 | 6/2008 | Tamada | |
| 2009/0263186 | A1 | 10/2009 | Hofmann | |
| 2011/0085774 | A1* | 4/2011 | Murphy | G02B 6/3865 264/1.25 |
| 2013/0142492 | A1 | 6/2013 | Querre | |
| 2013/0181446 | A1* | 7/2013 | Le Clinche | F16L 43/00 285/345 |
| 2014/0265305 | A1 | 9/2014 | Thompson | |
| 2014/0319823 | A1 | 10/2014 | Happich | |
| 2014/0327238 | A1 | 11/2014 | Bowman | |
| 2017/0328505 | A1 | 11/2017 | Sith et al. | |

FOREIGN PATENT DOCUMENTS

| | | |
|---|---|---|
| CN | 202710795 U | 1/2013 |
| CN | 107797193 A | 3/2018 |
| CN | 208721849 U | 4/2019 |
| DE | 202009003386 U1 | 7/2010 |
| EP | 0351466 A1 | 1/1990 |
| EP | 1433992 A1 | 6/2004 |
| EP | 1818702 A1 | 8/2007 |
| EP | 2131089 A1 | 12/2009 |
| EP | 2224157 A1 | 9/2010 |
| EP | 2317357 A1 | 5/2011 |
| FR | 2977945 A3 | 1/2013 |
| GB | 2398612 A | 8/2004 |
| GB | 2521272 A | 6/2015 |
| JP | 2002005373 A | 1/2002 |
| JP | 2007016820 A | 1/2007 |
| JP | 2008145641 A | 6/2008 |
| JP | 2010007820 A | 1/2010 |
| JP | 3178701 U | 9/2012 |
| KR | 20130000599 U | 1/2013 |
| WO | 96011355 A1 | 4/1996 |
| WO | 02016817 A1 | 2/2002 |
| WO | 2008104157 A2 | 9/2008 |
| WO | 2010001719 A1 | 1/2010 |
| WO | 2010007873 A1 | 1/2010 |
| WO | 2021005319 A1 | 1/2014 |
| WO | 2021005041 A1 | 1/2021 |
| WO | 2021005100 A1 | 1/2021 |

OTHER PUBLICATIONS

Office Action; Korean Patent Application No. 10-2022-7004252; Nov. 29, 2023.
Search Report; Chinese Patent Application No. 202080063452.8; Apr. 4, 2023.
Search Report; British Patent Application No. 1909903.5; Dec. 23, 2019.
Search Report; British Patent Application No. 1909903.5; Feb. 26, 2020.
Search Report; British Patent Application No. 1909906.8; Oct. 10, 2019.
Search Report; British Patent Application No. 1909909.2; Dec. 23, 2019.
Search Report; British Patent Application No. 1909909.2; Feb. 26, 2020.
Search Report and Written Opinion; International Patent Application No. PCT/EP2020/069089; Oct. 16, 2020.
Search Report and Written Opinion; International Patent Application No. PCT/EP2020/069228; Nov. 23, 2020.
Search Report and Written Opinion; International Patent Application No. PCT/GB2019/053602; Jan. 14, 2020.
Examination Report in AU Application No. 2020310533, dated Feb. 13, 2025.

* cited by examiner

TUBE COUPLING

CROSS-REFERENCE TO RELATED APPLICATIONS

This application is a continuation of U.S. patent application Ser. No. 17/560,805, filed Dec. 23, 2021, which is a continuation application claiming priority to PCT International Patent Application No. PCT/EP2020/069228, filed on Jul. 8, 2020, which claims benefit of GB 1909903.5, filed on Jul. 10, 2019; PCT International Patent Application No. PCT/EP2020/069089, filed on Jul. 7, 2020, which claims the benefit of GB 1909909.2, filed on Jul. 10, 2019; and PCT International Patent Application No. PCT/GB2019/053602, filed on Dec. 18, 2019, which claims benefit of GB 1909906.8, filed on Jul. 10, 2019.

INCORPORATION BY REFERENCE

U.S. patent application Ser. No. 17/560,805, filed Dec. 23, 2021; PCT International Patent Application No. PCT/EP2020/069228, filed on Jul. 8, 2020; GB 1909903.5, filed on Jul. 10, 2019; PCT International Patent Application No. PCT/EP2020/069089, filed on Jul. 7, 2020; GB 1909909.2, filed on Jul. 10, 2019; PCT International Patent Application No. PCT/GB2019/053602, filed on Dec. 18, 2019; and GB 1909906.8, filed on Jul. 10, 2019, are each hereby incorporated by reference as if set for in their entireties.

TECHNICAL FIELD

The present disclosure relates to a tube coupling. It has a particular application as fibre optic cable connector for use above or below ground. However, the concept can be applied more broadly to other types of connector.

BACKGROUND

Fibre optic connectors are used in the laying of fibre optic cables. The cables are used, for example, to provide a fibre optic cable connection from a junction box to a building such as an office or residence in order to provide a connection for internet data.

The fibre optic cables are provided in bundles of individual fibres which can be up to several kilometres long. The fibre bundles/cables are fed through tubes (often referred to as ducts/microducts/conduits) which are typically 50 metres long, but can be as long as 2000 metres. A number of tubes may therefore need to be connected together in order to support the full run of the fibre bundle.

Because of the manner of their use, there are number of demands on a fibre optic cable connector. Its outer diameter must be as small as possible in order to minimise bulk as the connectors are often grouped together in large numbers.

The cable bundle running through the middle of the connector must be visible in use. This is because it is essential for an operator to be able to visually confirm whether a fibre bundle runs through a particular connector. The tubes will be laid and the fibres may not be passed through until much later. An operator therefore needs to be able to determine which tubing does not yet have a fibre in place. Further, in the event of a fibre failure the operator can determine from a visual inspection whether a fibre is in place at a particular connector.

The connectors also need to be highly impact resistant. Cables are usually buried in the ground and, for maintenance, they need to be dug up. This is generally done by a labourer with a spade, and the first that the labourer will know if the presence of the cable is when it is struck by the spade. The connectors therefore need to be sufficiently robust to resist such an impact. In practice, they need to pass a '15J impact test'.

These latter two requirements, namely the need to be able to view the fibre and the need for high impact resistance represent conflicting requirements.

For most applications, connectors are made from an opaque plastic and these are readily available in the impact resistance forms. However, non-opaque materials are typically amorphous materials and are inherently more brittle than the opaque equivalents. As a result of this, prior art fibre optic cable connectors use a number of circumferential ribs in order to reinforce the connector. However, this leads to further problems. The ribs create a discontinuous profile for the connector leading to highly radiused regions which affect transparency. Further, dirt and stones are trapped between the ribs. The presence of stones can lead to an impact being directly transmitted to the ribs thereby causing damage. Further, the dirt is likely to be compacted over time and is therefore difficult to clear when trying to make a visual inspection of the fibre.

The connectors have a connection at either end which attaches to and retains the tube within the connector. This is done using a collet or grab ring. This grips on the outer wall of the tube and any movement which tends to pull the tube out the connector causes the collet to tighten its grip on the tube in a well-known manner. In order to release the tube, the collet can be manually displaced inwardly of the connector. This prevents the collet from gripping the tube allowing the tube to be withdrawn from the connector.

It is a requirement of the fibre optic cable connectors that the collet must be locked in place to prevent accidental release of the tube. This is conventionally done using a locking clip which clips between the end of the body of the connector and a collet ring thereby preventing axial movement between the body and the collet.+

These clips have a number of drawbacks. They are flimsy and exposed components and often break. Because they are exposed, they become clogged with dirt making them potentially difficulty to remove. They can become accidentally dislodged during installation and are then easily lost making the connector useless unless spare clips are carried. The clips then also displaced during installation. The installer will not necessarily know that this has happened as this may happen only when the connector is covered with earth.

The connectors are provided with an annular flange at a midway point along the through bore. When feeding a fibre or fibre bundle through the connector, this is done from a location hundreds of metres or even several kilometres away. If the fibre becomes snagged, this can create a significant problem as the cable and connector may need to be dug up to identify the problem.

A typical prior art arrangement is depicted in FIGS. 4A and 4B. A central annular stop S has radiused corners in order to avoid any abrupt transitions which might provide stressed concentrations which promote propagation. However, as can be seen in FIG. 4A, the radiused corner at the radially outermost part of the stop S means that the end face of the tube T at either end cannot fully seat on the end face of the stop S. As a result a gap G is created between the stop S and the tube T in which the fibre F can snag as shown in FIG. 4A. The situation in FIG. 4A assumes that the end of the tube T has been cut fully square. However, as shown in the left hand side of FIG. 4B, the situation is even worse when the tube T has been cut at an angle. In this case, the leading edge of the tube T (shown at the top of FIG. 4B) engages with the radiused corned and the tube T stops at this point. As can be seen at the bottom FIG. 4B, this creates an even bigger gap G' on the opposite side of the connector thereby creating an even bigger snagging hazard.

The present disclosure aims at addressing these problems.

SUMMARY

An alternative way of locking a collet within a connector is disclosed in EP2131089. This discloses the idea of a locking ring which is rotatably mounted on the body. The body is provided with a cam surface which cooperates with a cam follower on the locking ring. Rotation between the body and the locking ring changes the axial separation between the two components. The end of locking ring abuts against the collet ring. In a locked position, the axial separation between the locking ring and body is at its greatest. The engagement between the locking ring and the collet ring prevents axial movement of the collet such that the collet cannot be inwardly displaced into the position in which the tube can be released.

This connector is not designed for use with a fibre optic cable connector and, indeed, it would be unsuited to such a purpose. The locking ring fits over the external surface of the body. This adds to the bulk connector which is against the requirement in a fibre optic cable connector for the outer diameter to be as small as possible. The locking ring is exposed to dirt such that, in use, dirt particles could get into the locking ring and jam it in the locking position. Further, the locking ring is also exposed to damage during installation and the maintenance operations which can either cause the locking ring to fail, or become stuck in the locked position.

According to one aspect of the present disclosure, there is provided a tube coupling.

With the present disclosure, the locking of the collet is now achieved solely by interaction between the body and the collet. This eliminates the locking clip of the prior art. It also eliminates the locking ring of EP2131089.

Although the disclosure is motivated by the need to provide an improved fibre optic cable connector, because it provides improvements over EP2131089 in terms of the low profile nature of the connector, and the reduction in the number of components (as it does not require a locking ring) it can also be used in any of the contexts for which EP2131089 was designed. In particular, it is suitable for a wide range of plumbing applications which provide fluid communication.

Because the locking is done by the interaction between the body and the collet, the locking mechanism can effectively be internal to the body. This can provide a low-profile design and also protect the locking mechanism from impact damage and from the ingress of dirt.

The cam surface can be provided either on the body or the collet, but is preferably on the body. In this case, the cam surface can be moulded directly into the body as part of the body moulding process. However, this requires relatively complex tooling. Preferably, therefore, the body includes a cap retained by a main body portion, the cap being provided with the cam surface. The cap may be fitted over or within the main body portion. It may be retained by teeth which grip the main body portion, ultrasonic welding, a snap fit, a screw fit, or in any other way.

With the prior art fibre optic cable connectors, it is necessary for the collet to protrude beyond the body to allow an annular gap in which the locking clip is inserted. This is not necessary in the present disclosure. The collet ring can still protrude axially beyond the body, but, preferably, in the locked position, the collet ring does not protrude axially beyond the body. It may be flush with the body, but is more preferably recessed into the body. This protects the collet ring from impact damage and from dirt.

The collet ring may be a conventional annular collet ring that the user grips in order to rotate the collet between the locking and unlocked positions. However, an unlocking feature is preferably provided in the collet ring. This make take the form of one or more openings in the axial end face of the collet ring. However, these require the use of a tool and can become clogged with dirt.

Preferably, therefore, at least one lug projects from the collet ring axially away from the open end of the through way. This provides a point at which the collet can be readily gripped for rotation.

The at least one lug may not project axially beyond the body. However, the at least one lug preferably projects axially beyond the end of the body. This makes them easier to grip. Also, these lugs can provide a burr removing function. They can be shaped, for example to have an abrupt edge, such that a lug can be inserted into the cut end of a tube and scraped around the inner edge to remove any burrs left from the tufting process. These can create snagging hazards, in use, so for an operator to have a tool readily at hand to remove these will be very useful in practice.

There may be a single lug. However, preferably, there are two or more spaced lugs as this provides an improved grip and also allows a gripping function to be retained in the event that one of the lugs is damaged. As stated above, it is preferable that the collet ring does not protrude axially beyond the body. The at least one lug preferably protrudes beyond the axial end of the body so that it can readily be gripped.

At least one of the body and/or collet is preferably provided with a visual indication of the locked and/or unlocked positions.

In the vicinity of the locked position, the cam surface is preferably provided with a bump over which the cam follower rides. This serves to ensure the cam follower remains in the locked position and also provides a tactile indication to the user that the locked position has been reached.

When the coupling is used as tube connector, preferably the connector body is made of a non-opaque plastic.

Preferably an annular flange extends radially into the through way, each end face of the annular flange providing a stop surface for a respective tube end, wherein the annular flange is undercut such that its end faces are inclined such that the axial dimension of the flanges increases towards the axis. This uncut ensures that the inner edge of the tube is able to get closer to, and preferably abut, the annular flange. This eliminates or minimises the possibility of a fibre, which is subsequently passed through the connector once the tubes are in place, becoming snagged on the tube or the annular flange.

Preferably a plurality of annular splines are provided in the vicinity of the annular flange to deflect the outer wall of the tube as it approaches the flange. In practice, tubes are supplied on coils and have often been flattened into an oval cross-section. In the regions where the oval is at its widest, the inner diameter is larger than it should be and this exposes part of the annular flange in this region. This provides a snagging hazard for the fibre which is significantly reduced by the use of the splines.

According to another aspect of the present disclosure, there is provided a fibre optic connector.

The present disclosure takes a completely different approach to impact protection from that of the prior art. Rather than providing a number of external ribs, the impact protection of the present disclosure is provided by an inner sleeve which is spaced from an outer sleeve to define a gap.

Now, any impact on the body which is likely to cause deformation of the body will tend to cause inward deformation of the outer sleeve. However, because of the presence of the gap, any impact which is not directly aligned with the web of material can cause an inward deformation of twice the width of the gap before the inner sleeve will be compressed.

The webs could be arranged to be diametrically opposed to one another as the chance of impact aligned with a web is relatively small. However, preferably the web is arranged such that upon radical impact directly aligned with the web, the outer sleeve can be deformed by the width of the gap before any deformation occurs on the inner sleeve.

Because of this effect, it is desirable to make the/each web as small as possible. In practice, this is limited by the requirements of the moulding process as the plastic which forms the inner sleeve is required to flow through the web region.

While the optimum performance is met by a single web, the limitations imposed by the moulding process may mean that more than one web is required in practice. If more than one web is used, each web is preferably angularly offset from the other webs such that no part of the inner sleeve is supported at diametrically opposed locations. If this were to occur, any impact in this direction would be directly transmitted to the inner sleeve.

One of the webs needs to be made sufficiently robust that it will maintain the support of the inner sleeve within the outer sleeve. However, additional webs may be provided for moulding purposes. When a number of webs are provided, these can be made thinner such that they are effectively sacrificial webs. In the event of an impact, any deformation which is transmitted through the wall of the outer sleeve may cause the closest web to fail leaving the other webs to maintain the optimal location of the inner sleeve. The loss of one such sacrificial web is not a problem in use as the remaining webs hold the inner sleeve in place. The loss of more than one web due to impact will not be problematic as the inner sleeve is supported by the previously assembled tube.

The webs preferably extend in a non-radial direction, for example tangentially to the inner sleeve so as to reduce the component of the force transmitted to the inner sleeve.

The webs are preferably in the same radial plane. They are preferably offset from the centre of the connector so as not to impair visibility in this region.

As will be understood from the above description, the web should occupy a relatively small area of the outer surface of the inner sleeve.

Preferably, the total circumferential extent of all of the webs is less than 50%, preferably less than 20%, more preferably less than 10% and most preferably less than 5% of the circumference of the outer wall of the inner sleeve. By occupying less than 50% of the circumference of the outer wall of the inner sleeve, the web or webs can be arranged such that there is no diametric load path through two parts of the web at diametrically opposed locations on opposite sides of the inner sleeve.

Preferably, the web occupies less than 30%, more preferably less than 25% and most preferably less than 20% of the axial length of the outer wall of the inner sleeve. Preferably, the web occupies less than 10%, more preferably less than 5% and most preferably less than 3% of the area of the outer wall of the inner sleeve. All of these measurements represent the dimension of the web at its widest point.

Because of the different approach taken by the present disclosure to impact protection, the need for the ribs of the prior art can be significantly reduced. Preferably, the present disclosure eliminates the need for ribs all together so that preferably, the outer face of the connector bodies is devoid of ribs. This removes any stress concentrators at the outer surface of the connector as well as removing any potential dirt traps.

Preferably, at least the axially central third of the connector body has a continuous cylindrical outer surface of constant radius. This central portion corresponds to the region where the fibre will be exposed in the connector. More preferably, the requirement for a continuous cylindrical outer surface of a constant radius extends along substantially all of the length of the connector body. The ends of the connector body, however, may have a radius profile.

Not only does such an arrangement remove the stress concentrators and dirty traps, it also improves the clarity of the connector. The continuous cylindrical surface is much easier to see through than the ribs of the prior art in which, even after cleaning, a residual amount of dirt is likely to remain. Further, the use of ribs caused internal reflection of light which hampers direct visibility of the region at the centre of the connector. This does not happen with the cylindrical outer surface. Not only is this easy to wipe clean, but the mould can be polished in the central region providing further visibility improvements.

Preferably the non-opaque body is configured such that part of the through bore is visible, in use, from outside the connector body when the tubes are connected in place.

This may be achieved by each end of the connector receiving an O-ring to seal with a respective tube inserted into a respective end of the connector, the O-rings being spaced from a central transparent portion of the connector.

The respective connectors may be received on the outside of the connector body, but are preferably received within each end of the connector body. This provides a low profile device and protects the connectors from dirt and damage.

An annular flange preferably protrudes into the through bore to provide an end stop for the tubes. In this case, the through bore is preferably visible, in use, through the flange.

According to a further aspect of the present disclosure, there is provided a fibre optic cable.

By providing the undercut flange, the present disclosure ensures that the radially innermost edge of the tube engages with the annular flange before the radially outermost edge engages. This significantly reduces or eliminates the gap between the tube and the annular flange. In the case of a tube end which has been cut square, the presence of the undercut will eliminate the gap on both sides of the tube. In the case of a tube end which has not been cut square, the presence of the undercut will eliminate the gap on one side of the tube (unless the tube has been cut at a very oblique angle) and, on the opposite side of the tube, the gap is significantly reduced as the leading edge which has landed on the annular flange has travelled further into the connector than it would in the prior art.

Thus, by making a simple modification to the shape of the connector, the snagging problem is significantly reduced or eliminated.

In order to reduce any stress concentrations, the interface with the annular flange and the connector body is preferably radiused to provide a curved transition. Similarly, the innermost corners of the annular flange are preferably radiused to provide a curved transition.

In the prior art, the inner diameter of the flange is set to be the same as or bigger than the inner diameter of the tube being inserted into the connector. In the present case, preferably the inner diameter of the flange is smaller than the inner diameter of the tube, in use, inserted into the connector. This aspect of the disclosure extends to a tube cable connector in combination with a tube inserted into the connector, the inner diameter of the flange being smaller than the inner diameter of the tube.

This is a counterintuitive step as this deliberately is a decrease in the minimum inner diameter through the connector. However, making the diameter of flange slightly smaller than the inner diameter of the tube in combination with the requirement for the innermost corners of the annular flange to be radiused, means that although the annular flange protrudes slightly beyond the inner diameter of the tube, this protrusion is a curved transition such that any fibre which abuts against one of the inner most corners of the annular flange simply guided through the opening in the flange. If, as set out above, a small gap does arise between the flange and the end of the tube, the radiused corners guide the fibre away from the tube edge. It is far better for the fibre to encounter the radiused corner of the annular flange, than an abrupt and exposed edge on the end of a tube.

Another problem which arises in connectors of this type is caused by the fact that the tubes are generally supplied wound on a coil. This tends to flatten the tube such that it is deformed from a truly circular shape into an oval shape. When the tube is inserted into a connector in this oval configuration and abuts against the annular flange, its internal diameter will be larger in one direction and shorter in a transverse direction. In the direction where it is largest, this will expose the annular flange in these regions thereby providing a snagging hazard.

Preferably, therefore, a plurality of axial splines are provided on the wall of the through bore in the vicinity of the annular flange to deflect the outer wall of the tube as it approaches the flange. The splines will engage with any part of the tube which has an enlarged radius and exert radially inward force in order to push these portions radially inwardly by creating a more rounded shape at the end of the tube meets the annular flange. The requirement for axially extended splines does not mean that the splines have to extend in purely axially direction. Instead, it is sufficient that they extend a reasonably axial extent such that they will exert the inward force on the tube as it approaches the annular flange.

The splines may have a constant thickness. However, preferably, the thickness of the splines increases towards the annular flange. This allows the thinner parts of the splines away from the annular flange effectively provide a tapered entry way into the splined section, while increased spline thickness provides an increased compression force the closer the tube gets to the annular flange. The presence of the splines allows a compressive force to be provided to the non-circular regions of the tube. However, there is still space between adjacent splines for the deformed tubed material to be pushed into so that the tube does not become stuck within the connector.

Further, the body preferably comprises an outer sleeve and an inner sleeve, the inner sleeve being configured to receive a distal end of a respective tube, the outer wall of the inner sleeve being generally spaced from an inner wall of the outer sleeve to define a gap, the inner sleeve being supported on the outer sleeve by a discrete web of material which supports the inner sleeve and maintains the gap between the inner and outer sleeves. With this arrangement, rather than providing a number of external ribs as in a conventional connector, the impact protection of the present disclosure may provide by an inner sleeve which is spaced from an outer sleeve to define a gap. Preferably there is more than one web. The webs are preferably in the same radial plane. The webs are preferably axially offset from the annular flange so as not to impair visibility into that region. This provides an impact protection feature as the gap allows any impact on the outer sleeve to deform the outer sleeve which will deform into the gap before it deformed the inner sleeve.

With this arrangement the need for the ribs of the prior art can be significantly reduced. Preferably, this eliminates the need for ribs all together so that preferably, the outer face of the connector bodies is devoid of outer ribs and has a continuous outer surface of constant radius. This removes any stress concentrators at the outer surface of the connector as well as removing any potential dirt traps.

BRIEF DESCRIPTION OF THE DRAWINGS

An example of a fibre optic cable connector in accordance with the present disclosure will now be described with reference to the accompanying drawings in which:

FIG. 3 is a cross-section in the plane of FIG. 2B of the connector with tubes connected and a fibre bundle passing through;

FIG. 3B shows a view similar to FIG. 3A, with a different configuration of tubing and without the fibre passing through;

DETAILED DESCRIPTION

Figure 1A:
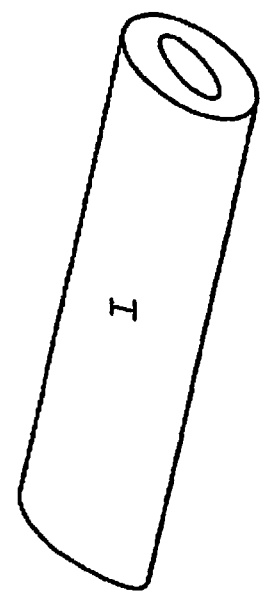
FIGS. 1A-1C are cut-away perspective views of the connector showing the progressive insertion of a tube.
Figure 1A:
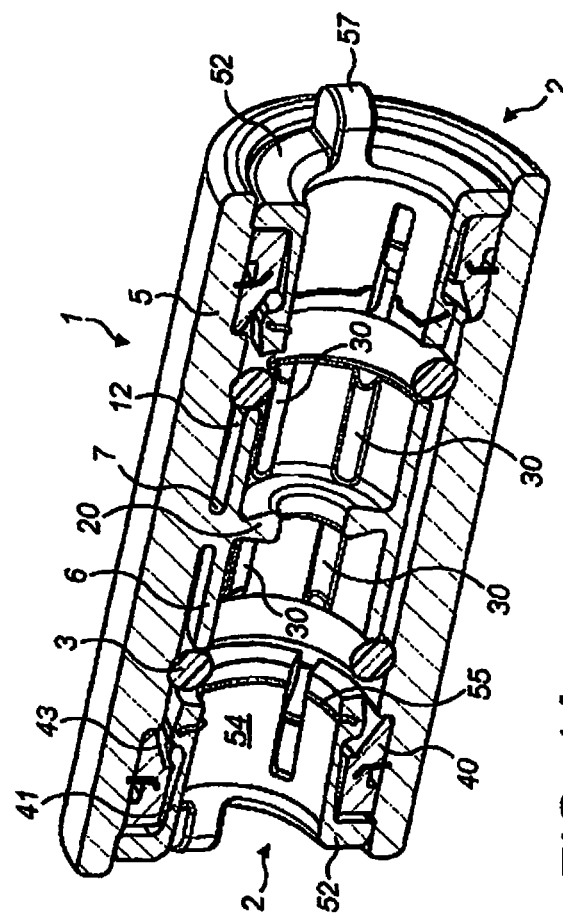

The connector comprises a connector body 1 having a generally hollow cylindrical configuration centred on a main axis X. A connector 2 (described in greater detail below) is provided at either end to receive and grip a tube T at each end which is sealed by an O ring 3.

The body 1 is moulded from a non-opaque plastic. The plastic must be such that it is clear enough that a visual inspection externally of the connector allows an operator to determine whether a fibre or fibre bundle F is present in the centre of the connector. Ideally, the body should be as close to transparent as possible. However, practical considerations mean that the body will not be truly transparent. Instead, the body is likely to translucent to a sufficient extent that the fibre is visible. Suitable materials are polycarbonate, polystyrene, polyester, acrylic and nylon. The body 1 is formed in a moulding process and can optionally be polished to improve the clarity of the body. As can be seen in the various figures, the outer profile of the body is a smooth configuration which is devoid of external ribs thereby eliminating any stress concentrations and orifices for the accumulation of dirt.

The body 1 is made up of an outer sleeve 5 and an inner sleeve 6 which are connected by at least one web 7 as described below.

The outer sleeve 5 has an axial bore 8 which is opened at the distal end and which has a first step 10 and second step 11 which receive the connector 2 as described below.

Figure 2A:
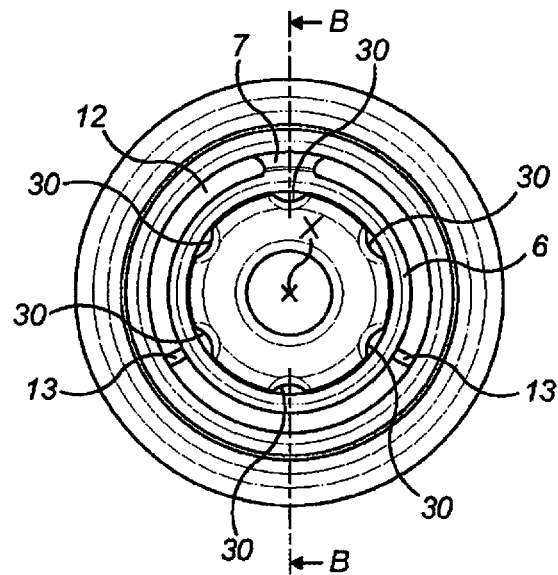
FIG. 2A is a cross-sectional view of the connector body in a plane perpendicular to the main access of the connector body through line A-A in FIG. 2B.

The inner sleeve 6 is retained by the web 7 so as to form a gap 12 of generally uniform thickness as best seen in FIG. 2A.

Figure 2B:
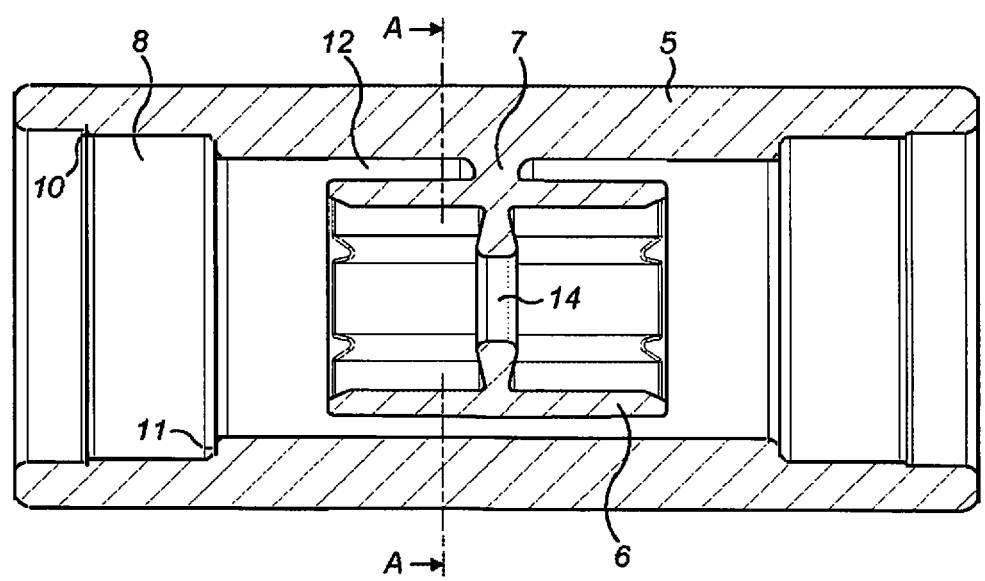
FIG. 2B is a cross-sectional view of the connector body in plane through the main axis of the body through line B-B in FIG. 2A.

As will be appreciated from FIGS. 2A and 2B, the web 7 extends across only a very small part of the inner sleeve 6 so that the gap 12 is present for most of the length and circumference of the inner sleeve 6.

Any impact on the outer sleeve 5 which occurs during the installation of the tubing, or when the tubing is dug up for maintenance can cause deformation of the outer sleeve 5.

By providing the gap 12, the effect of any external impact on the outer sleeve 5 is isolated, to a significant extent, from the inner sleeve 6, and hence is largely prevented from causing any change to the diameter of the inner bore 14 of the inner sleeve 6. Initial tests show that this design is effective in resisting external impact. Further, this can be achieved in a manner which does not require the addition of ribs and does not require an increase in the outer diameter of the connector.

Use of the very small size of the web 7 means that the chance of an impact being directly transmitted from the outer sleeve 5 to the inner sleeve 6 via the web 7 is greatly reduced. Even if this were to occur (i.e., an impact were to be applied in the vertical downward direction in FIG. 2A at the centre point connector in FIG. 2B), the inner sleeve 6 can still deflect by an amount equivalent to the width of the gap 12 before any stresses occur on the inner sleeve which would have an adverse effect on the internal bore 14 of the inner sleeve 6.

In order to mould the body, 1 all of the plastic required for the inner sleeve 6 is required to pass through the webs 7, 15. This represents a reasonably significant amount of plastic which flows into a relatively complex and narrow flow path. In order to alleviate this, we are contemplating providing one or more additional webs 13 depicted schematically in FIG. 2A these are angularly offset with respect to the web 7 and may also be axially offset to ensure that there is no point at which the inner sleeve 6 is supported on diametrically opposed sides. The additional webs 13 provide further flow paths for the plastic into the inner sleeve during the moulding process. Multiple webs can be made weaker than a single web such that whichever web is closest to the impact will preferentially fracture under an applied load leaving the remaining ribs to support the inner sleeve 6.

Figure 2C:
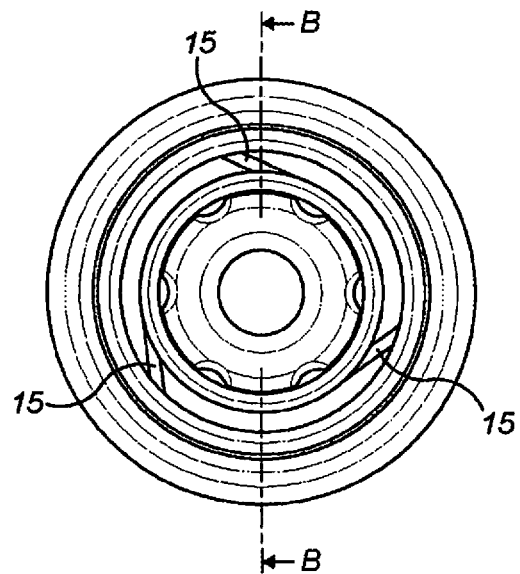
FIG. 2C is a view in the same plane as FIG. 2A showing a second example of a connector.
Figure 2D:
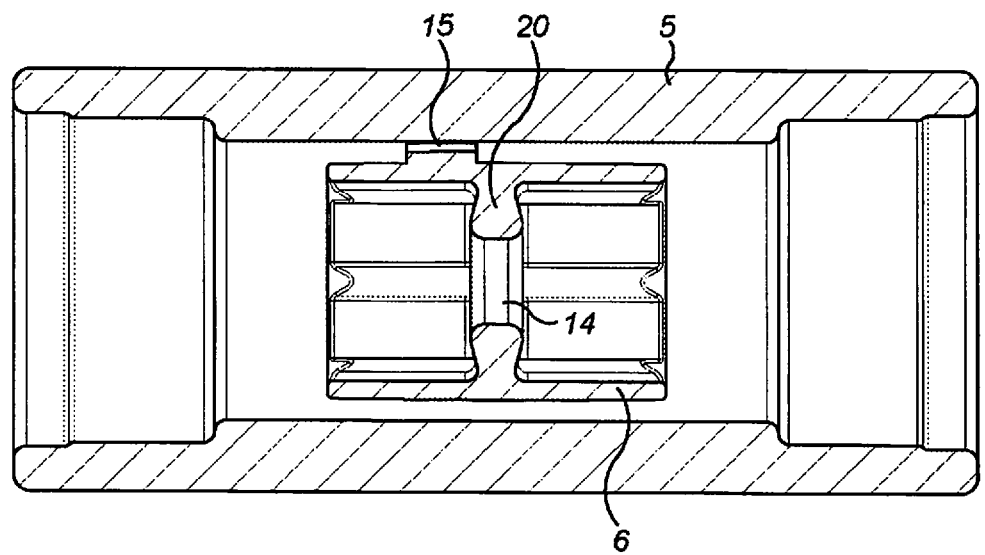
FIG. 2D is a view in the same plane as FIG. 2B showing the second example.

Instead of extending in a radial sense as shown in FIG. 2A, each web 15 may extend tangentially as shown in FIG. 2C, or in any other direction across the gap 12. As shown in FIG. 2D, the webs 15 are axially offset from an annular flange 20 so that they do not impair the visibility into this region. The outer sleeve 5, inner sleeve 6, web(s) 7 and annular flange are preferably all moulded as a single component as illustrated.

The manner in which the connector is configured in order to avoid snagging of the fibre F will now be described with reference to FIGS. 3, 3A and 3B with FIGS. 4A and 4B being used to provide a comparison with the prior art.

Figure 3:
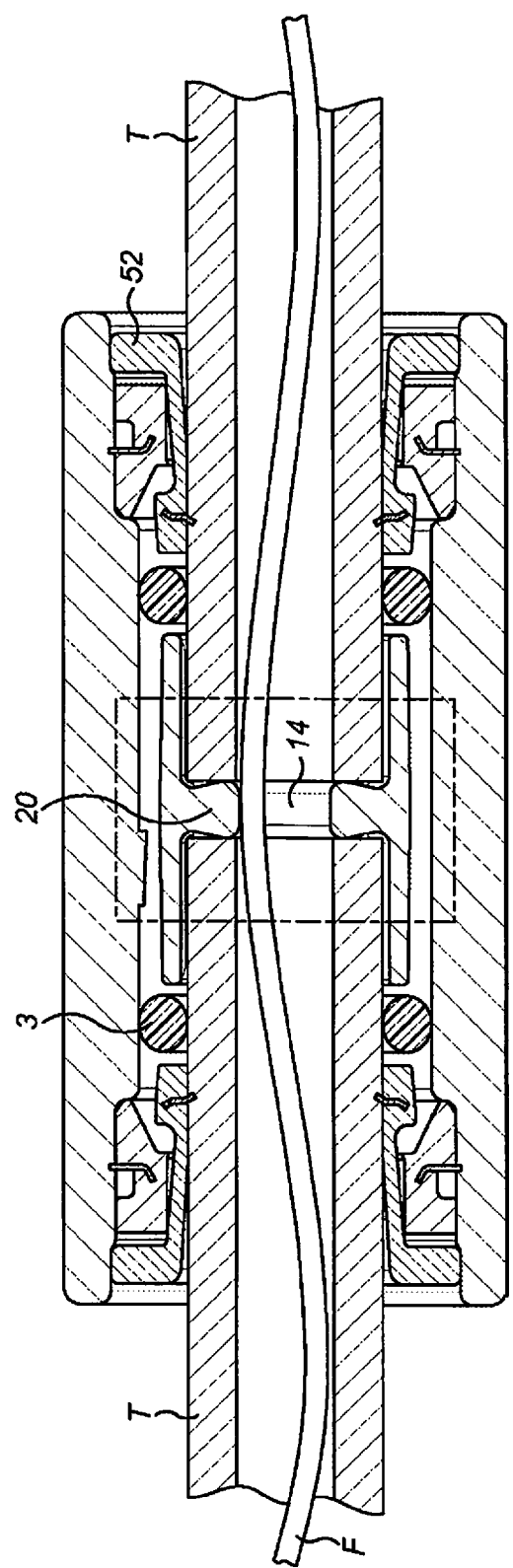

FIG. 3 shows the connector body 1 with a tube T fixed and sealed in either end. Once connected in this way, the fibre F is blown from one end through the tube T, across the interface between the tubes and into the adjacent tube.

The tubes T abut against the annular flange 20 at a midpoint of the inner sleeve 6. The connectors 2 and O-rings 3 broadly have the same inner diameter as the inner diameter of the inner sleeve 6 so that, when the tube T is pushed into the body 1, it is guided into the inner sleeve 6. The end of the tube T then abuts the annular flange 20. As best seen in FIGS. 3A and 3B, the annular flange 20 is provided undercut portion 21 such that the thickness of the annular flange 20 in the axial direction increases towards the axis X.

As a result of this, the innermost corner 22 of the tube T is the first part of the tube T to abut the annular flange 20. This means that there is no gap between the inner face 23 of the tube T and the annual flange 20.

Figure 3A:
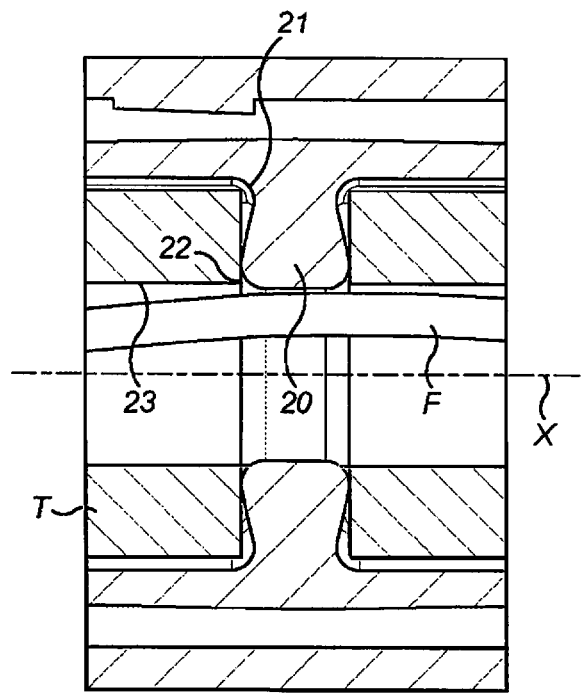
FIG. 3A shows the central portion of FIG. 3 in greater detail.
Figure 3B:
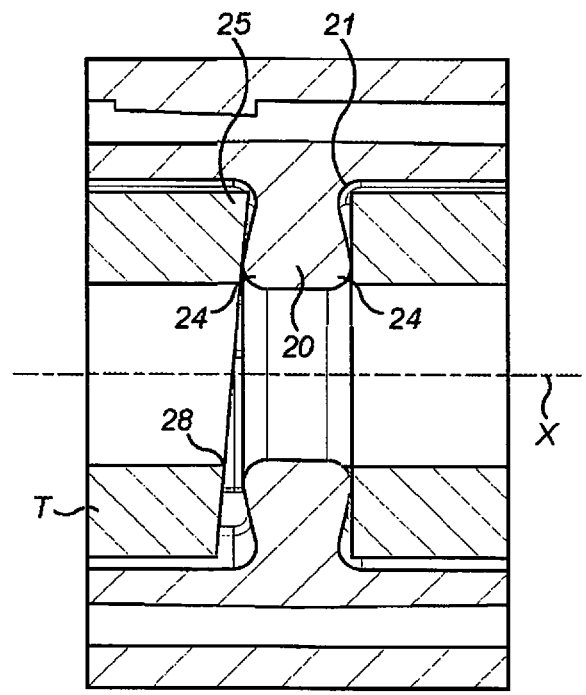

The undercut portion 21 is radiused as shown in FIGS. 3A and 3B. Similarly, the radially innermost corners 24 of the annular flange are radiused to present a smooth surface to the fibre.

Figure 4A:
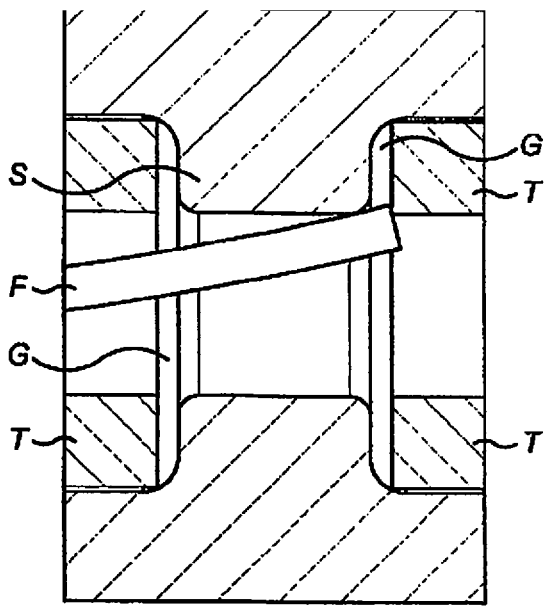
FIGS. 4A and 4B correspond to FIGS. 3A and 3B illustrating a prior art arrangement.

In comparison with the prior art arrangement shown in FIG. 4A, the elimination of the gap G between the end of the tube T and the annular flange 20 means that there is no exposed abrupt edge of the tube T for the fibre F to snag on.

FIG. 3B depicts the situation where the left-hand tube has been cut at an angle which is slightly oblique to a plane perpendicular to the axis X. As a result of this, the uppermost edge 25 of the tube T enters into the undercut region 21 and seats on the annular flange 20.

Figure 4B:
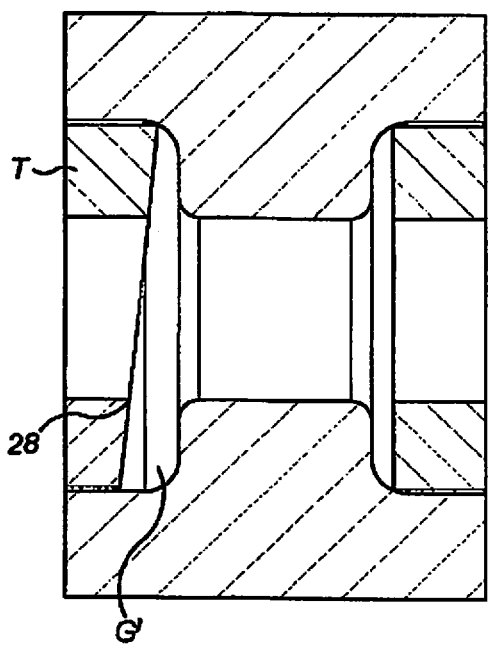
Figure 5:
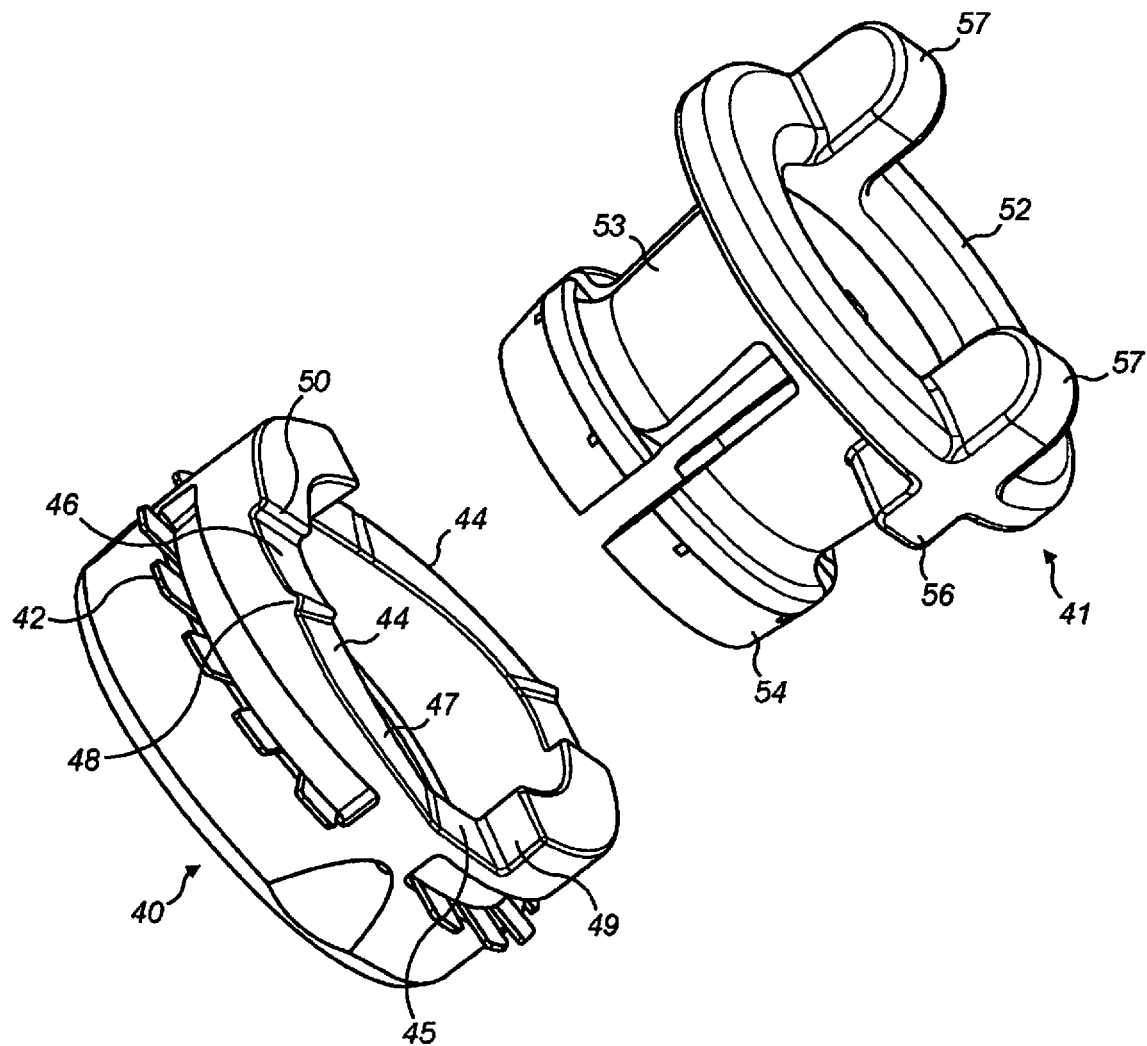
FIG. 5 is an exploded perspective view of the connector from one end of the connector body.

By comparison with FIG. 4B it can be seen that the gap between the tube T and the annular flange 20 is eliminated in the top half of the figure and the gap at the bottom is significantly reduced as compared to FIG. 4B.

As will to be apparent from FIGS. 3A and 3B, the radially inward extent of the annular flange 20 is greater than the inner diameter of the tube T. As a result of this, the annular flange 20 protrudes slightly inwardly beyond the inner face 23 of the tube T. From a comparison of FIGS. 3B and 4B, if it is assumed that the fibre F is fed from right to left, and in the vicinity of the connector 1 the tip of the fibre is travelling along the lower part of the inner face 23 in FIGS. 3B and 4B, in the FIG. 3B, this will initially encounter the corner of the annular flange 20 which projects slightly beyond the inner surface 23 of the tube T. However, the fibre F can easily ride over this curved corner and, in doing so, this deflection should push the tip of the fibre above the exposed edge 28 of the tube T. By contrast, in FIG. 4B, annular projection S does not protrude beyond the inner surface 23 of the tube so there is nothing to begin to deflect the fibre F back towards the centre of the bore. Further, the gap G' in FIG. 4B is significantly larger than the corresponding gap in FIG. 3B. This, not only is fibre not deflected away from this gap, the presence of the large gap affords a significantly greater opportunity for fibre to enter the gap and become snagged on the edge 28 of the tube T.

A further feature which prevents snagging of the tube is the splined arrangement listed as best illustrated in FIGS. 1 and 2.

As can be seen from these figures, six axially extending splines 30 are equally spaced around the circumference of the inner sleeve 6. These are shown having a constant cross-section in a plane perpendicular to the axis. However, they may have a thickness which increases towards the annular flange 20.

Figure 1B:
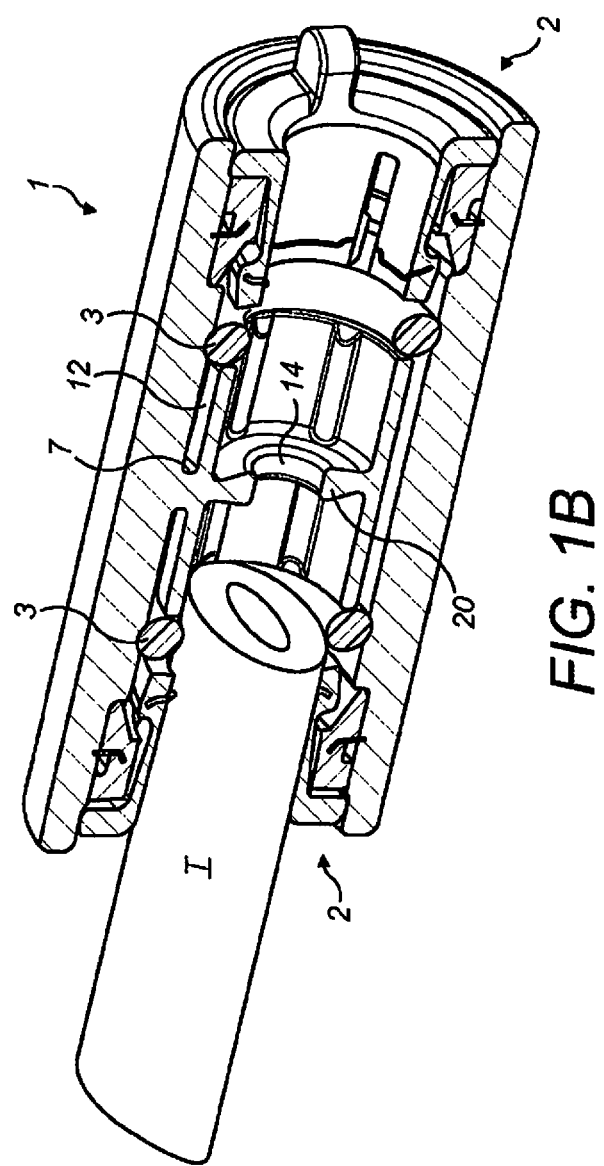
Figure 1C:
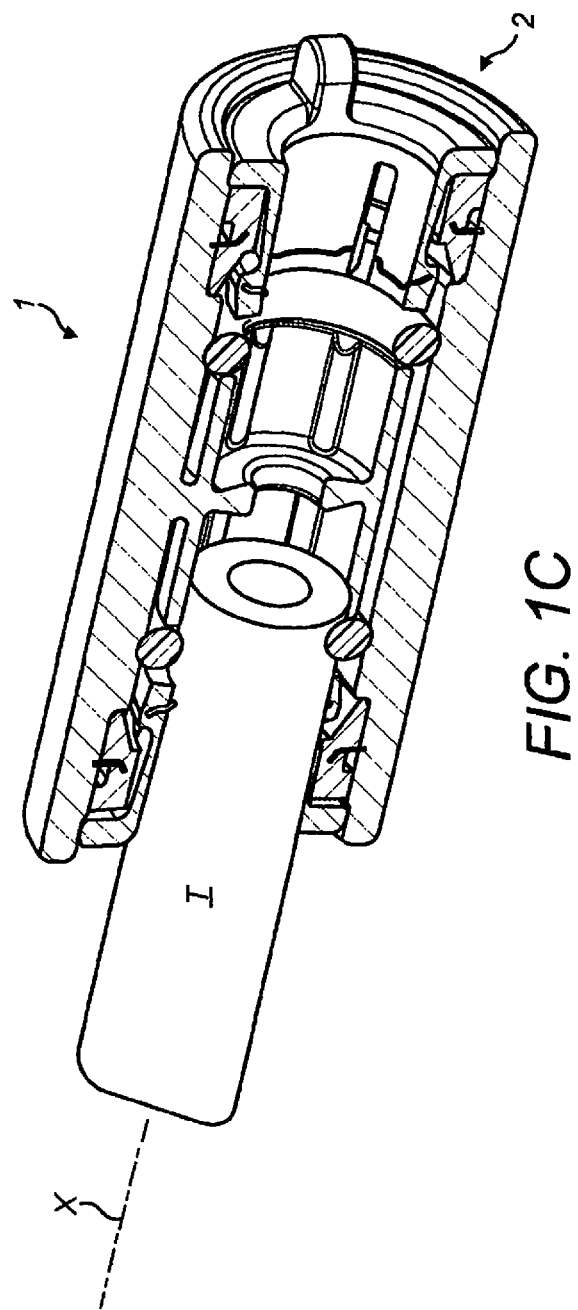

As shown in FIGS. 1A and 1B, a tube T has been fed from a coil and has taken on a flattened oval shape. As this enters the inner sleeve 6 the tube T engages with the enlarged portions of the tube T and tend to push this back to a more circular shape as shown in FIG. 1C.

Any number of splines may be used. However, six has been found to be a reasonable number. This allows engagement with a flattened tube which is inserted in any orientation. A smaller number of flanges risks the possibility that the enlarged part of the tube enters between adjacent splines. On the other hand, adding more splines increases the insertion resistance for the tube T into the connector 1.

The splines 30 are dimensioned such that where the splines are present is slightly smaller than the outer diameter of the tube. The splines 30 will therefore bite into the material of the tube T in these regions. This ensures a secure and robust fit of the tube T and also provides the maximum opportunity for the splines to reduce the eccentricity of the tube.

The arrangement of the annular flange 20 and the splines 30 has been described in the context of the arrangement with the outer sleeve 5 and inner sleeve 6 supported by a web 7. Both the annular flange 20 and the splines 30 could, however, be employed in a connector with a more conventional construction which does not have the inner sleeve 6. Instead, the through bore and inner flange are formed directly in the main body. With such an arrangement, reinforcing ribs would be provided in order to give enhanced impact resistance.

There is, however, a synergy between the enhanced impact resistance provided by the inner sleeve 6 and the web 7 and the arrangement of the annular flange 20. The impact test carried out these connectors requires the connector to be subjected to an impact and that this impact does not cause a reduction of more than 15% of the inner diameter of the tube. As set out above, the annular flange 20 already protrudes a small amount into this area. This provides an anti-snagging benefit. However, it does mean that a smaller inward deformation of the connector in the vicinity of the annular flange 20 would fail the impact test as we have already pre-engineered the annular flange to go some way towards encroaching on the 15% region beyond which it will fail the test. However, because of the enhanced ability of the sleeve 6/web 7 arrangement to resist impact, we can afford to make the reduction in the inner diameter in order to improve the anti-snagging properties whilst still maintaining sufficient impact resistance to reliably meet the test requirements.

The connectors 2 (one at each end of the body 1) will now be described in greater detail with reference to FIGS. 5 to 8.

The connectors 2 are formed of two components, namely a cartridge 40 and a collet 41.

The cartridge 40 has a generally annular configuration. The outer surface is provided with a plurality of flexible metal teeth 42. The cartridge 40 is inserted into an end of the body 1 until it seats against the second step 11. The teeth 42 grip the wall of the body 1 to ensure that the cartridge 40 is permanent retained in the body 1. At the end of the cartridge 40 adjacent to the second step 11, there is a tapered cam surface 43 which cooperates with the collet as described below. At the opposite end, the end face of the cartridge 40 is provided with a pair of ramped surfaces 44. Although two such surfaces are shown, there may be a single surface or there may be more than two. Each ramp surface has a low point 45 corresponding to an unlocked configuration and a high point 46 corresponding to a locked configuration within an inclined face 47 in between. A bump 48 is provided at the interface between the high point 46 and the inclined face 47. A similar bump may be provided interface between the incline face 47 and the low point 45. The low point 45 terminates at the first end stop 49 and the high point 46 terminates at a second end stop 50.

Most of the features of the collet 41 are conventional. It has a collet ring 52 from which a plurality of flexible arms 53 extend. Each arm has a head 54 at its distal end as is provided with an inwardly projected metal tooth 55.

Figure 8A:
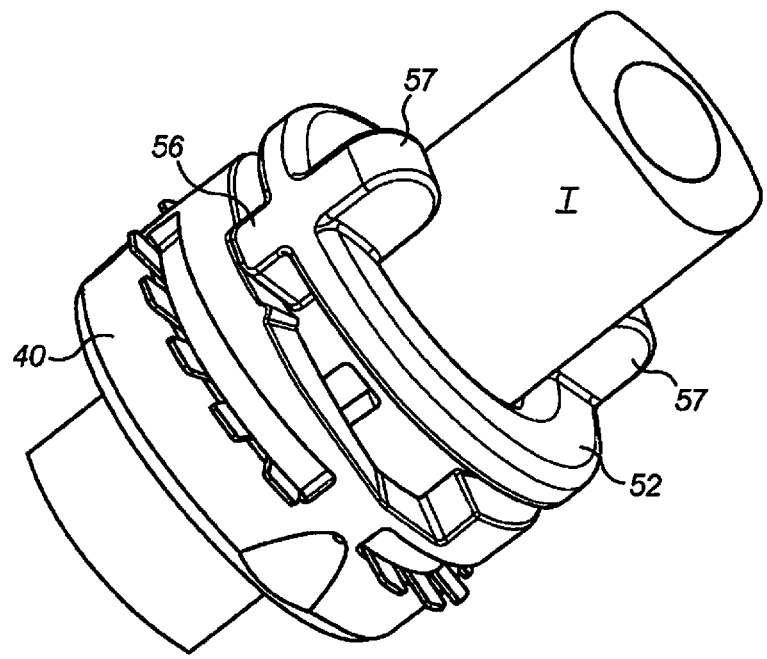
FIGS. 8A and 8B correspond to FIGS. 7A and 7B but show the tube in situ.
Figure 8B:
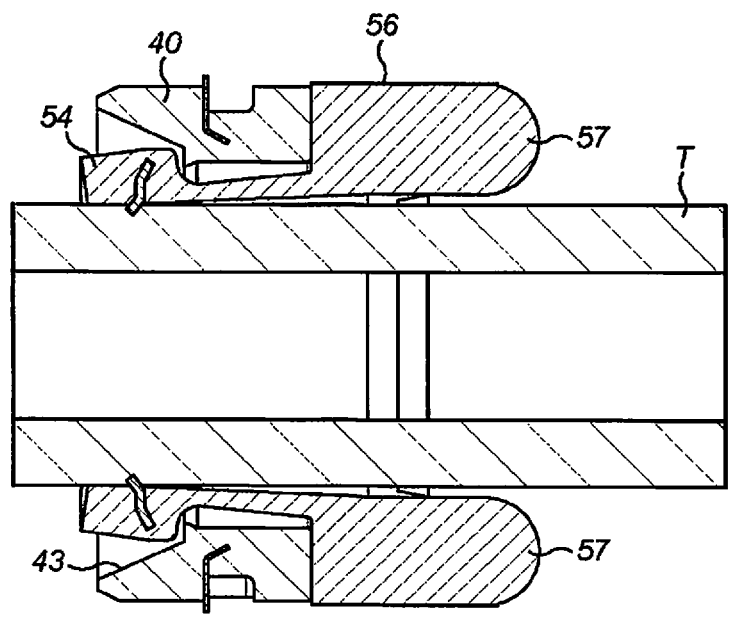

With a tube T inserted for example as shown in FIG. 8B, any movement tending to pull the tube T out of the connector causes the teeth 55 to grip into the tube, this pulls the heads 54 towards the tapered cam surface 43 on the cartridge 40 deflecting the arms 53 inwardly to provide a progressively increasing gripping force on the tube T. This serves to hold the tube T securely in place. This is the conventional manner in which a collet operates.

The adaptation provided by the present disclosure is the presence of a pair of cam followers 56 extending from the collet ring 52 towards the ramped surface 44 on the cartridge 40. Although two followers 56 are shown, in practice there are as many followers 56 as there are ramped surfaces 44. Alternatively, the cam arrangement may be inverted such that the ramped surface(s) is/are on the collet and the follower(s) is/are on the cartridge The collet ring 52 is also provided with a pair of tabs 57 which extend from the collet ring 52 the opposite direction to the followers 56. As shown in the drawings, the position of the tabs 57 corresponds to a number and position of the followers 56. However, this may not be the case. The components can be offset from one another and there need not be same number of both.

Figure 6A:
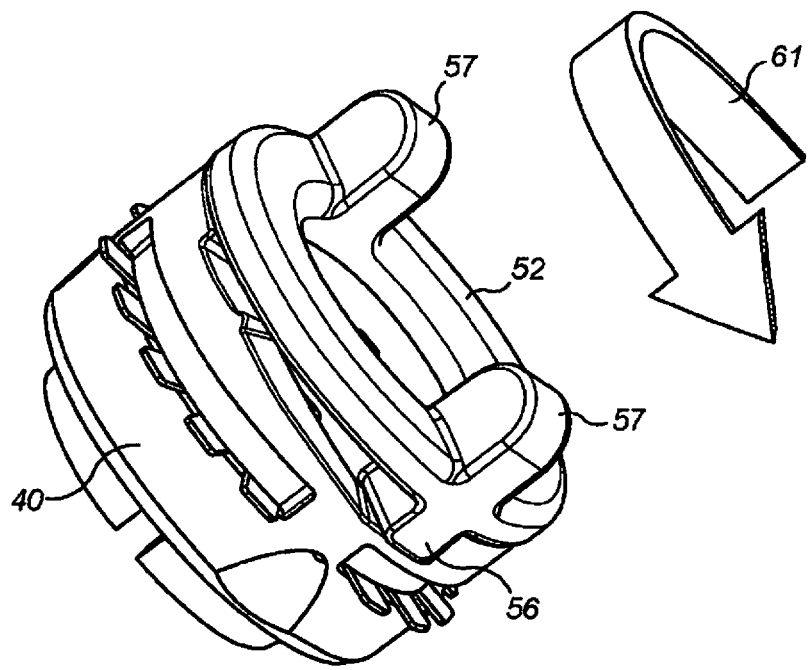
FIG. 6A is the equivalent to FIG. 5 in non-exploded form, showing the cartridge and collet in a first angular configuration.
Figure 6B:
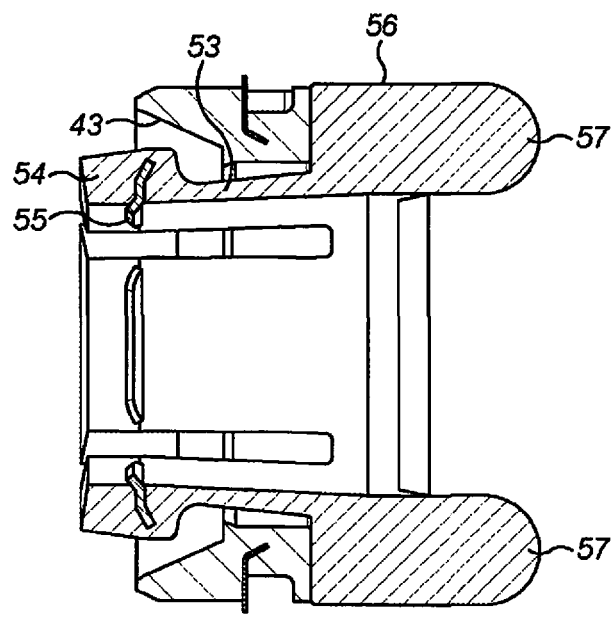
FIG. 6B is a cross-section through a plane in FIG. 6A through the locking tabs.
Figure 7A:
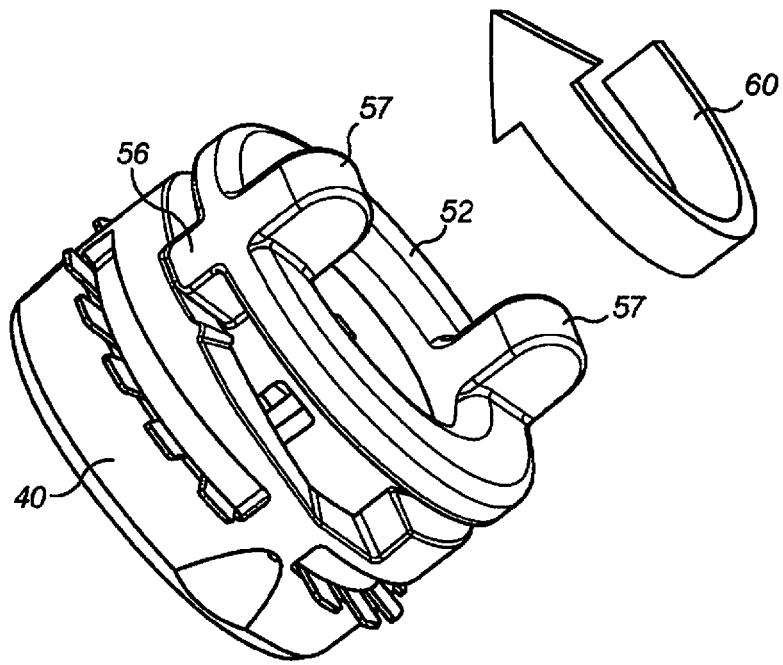
FIGS. 7A and 7B are views corresponding to FIGS. 6A and 6B respectively showing the cartridge and collet in a second angular configuration.

The operation of the collet 41 will now be described with reference to FIGS. 6 to 8. The position shown in FIGS. 6A and 6B is an unlocked position. In this position, the collet 41 has been rotated such that cam followers 56 abut the first end stops 49 such that the cam followers are at the low point 45. As will be apparent from FIG. 6B (particularly when compared with FIG. 7B) in this position, the collet 41 has a relatively large degree of axial freedom as it can move from the position in which the heads 54 engage with the tapered cam surface 43 all the way to the left (with reference to FIG. 6B) in the position shown in that figure. If held in that position by a user, the tube T can be withdrawn because the heads 54 are kept away from the tapered inclined surface 43 such that the collet cannot grip the tube. The collet 41 is then rotated in the direction of arrow 60 into the locked position shown in FIG. 7A. In doing so, the followers 56 moves up the inclined faces 57, over the bumps 48, providing a tactile feel to the user that a position has been reached, and onto the high point 46.

Figure 7B:
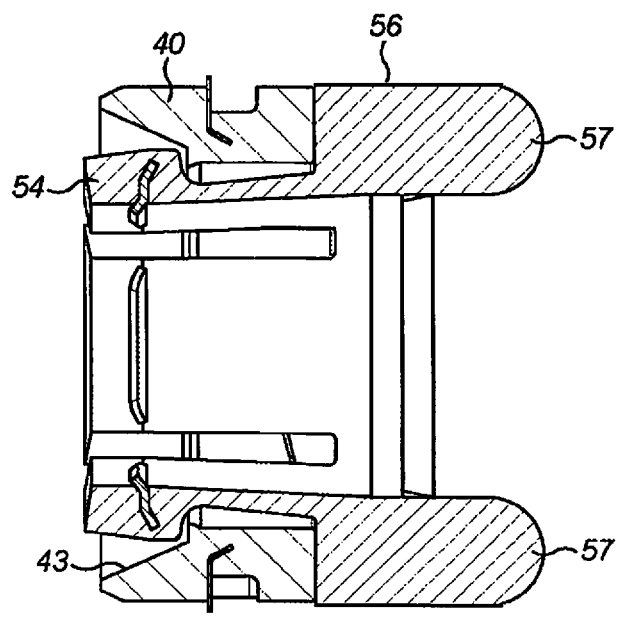

As will be appreciated from a comparison of FIG. 6B and FIG. 7B, in the locked position shown in FIG. 7B, the collet has nothing like the same degree of freedom as in FIG. 6B so that it cannot be moved and held into an unlocked position where the teeth 55 disengage with the tube T. This is more apparent from FIGS. 8A and 8B which show the collet in the same locked position as in FIGS. 7A and 7B but with the tube in place. Here it can be seen how the presence of the tube pushes the heads 54 back onto the tapered cam surface 43.

The only way to remove the tube T in this locked configuration is for the user to grasp the tabs 57, rotate the collet 41 in the direction of arrow 61 in FIG. 6A to the unlocked position, and manually hold the collet in the position shown in FIG. 6B while pulling the tube out of the body 1.

The tube T will usually be inserted with the collet 41 in the unlocked position shown in FIGS. 6A and 6B as this allows for more scope for the arms 53 to be deflected upon insertion of the tube. However, as can be seen in FIG. 7B, even in the locked position, there is a small clearance between the head 54 and the tapered cam surface 43. Thus, it is possible to insert the tube T with the collet in the locked position. This provides a simple assembly process as the user needs only to be told to insert the tube into the collet. They do not need to concern themselves with the locking operation.

As can be best seen from FIGS. 1A to C and FIG. 3, the collet ring 52 is axially set back inside the body 1. However, the tabs 57 extend beyond the end of the body 1. In this position, the collet 41 is protected from external impacts by the body 1. Further, because it is recessed within body 1, it is, to some extent, shielded from the soil in which the cables are buried. With this connector, the only points where dirt can potentially enter internal workings of the connector are between the collet ring 52 and the tube T and between the collet ring 52 and the body 1. However, these are interfaces where tight tolerances can be applied. Any dirt entering here cannot impair the visibility of the fibre F within the body 1. Further, because of the rotary action required to unlock the collet, even if some dirt does enter into these gaps, this is unlikely to jam the collet 41 in place as a rotary motion can readily generate sufficient torque to overcome any such sticking.

The tabs 57 have right angled corners. This allows them to be inserted into the cut end of a tube T and scraped around the inner edge of the tube to remove any burrs which are formed during the cutting operation and which might otherwise create a snagging hazard for the fibre F. The edge may be shaped in a different way to provide more effective burr removal.

The connectors 2 described above are in the combination with an unconventional arrangement of the outer sleeve 5 and inner sleeve 6 supported by a web 7 and the annular flange 20 and the splines 30. However, the connectors can equally be used in a coupling which has a conventional interior without these features.

The invention claimed is:

1. A fibre optic cable connector, the fibre optic cable connector comprising a connector body made of a plastic, the connector body defining a through bore and having a connector at either end for connection to a respective tube;
   the connector body comprising an outer sleeve and an inner sleeve, the inner sleeve being configured to receive the distal end of the respective tube;
   wherein there are a plurality of webs; and
   at least one discrete web of material integrally formed with the outer and inner sleeves, the at least one discrete web defining air gaps on opposing sides thereof between an outer wall of the inner sleeve and an inner wall of the outer sleeve, the inner sleeve being supported on the outer sleeve by the at least one discrete web of material;
   wherein the plurality of webs are axially offset from a center of the connector.

2. A connector according to claim 1, wherein the at least one discrete web of material is circumferentially intermittent.

3. A connector according to claim 1, wherein the at least one discrete web of material extends in non-radial direction.

4. A connector according to claim 1, wherein the at least one discrete web of material is tangential to the inner sleeve.

5. A connector according to claim 1, wherein the at least one discrete web of material is arranged such that, upon a radial impact directly aligned with the at least one discrete web of material, the outer sleeve can be deformed by the width of the air gap before any deformation occurs on the inner sleeve.

6. A connector according to claim 1, wherein the total circumferential extent of all the plurality of webs is less than 50% of the circumference of the outer wall of the inner sleeve.

7. A connector according to claim 1, wherein the at least one discrete web of material occupies less than 50% of the axial length of the outer wall of the inner sleeve.

8. A connector according to claim 1, wherein the at least one discrete web of material occupies less than 10% of the area of the outer wall of the inner sleeve.

9. A connector according to claim 1, wherein the outer face of the connector body is devoid of ribs.

10. A connector according to claim 1, wherein at least an axially central third of the connector body has a continuous cylindrical outer surface of constant radius.

11. A connector according to claim 10, wherein substantially all of a length of the connector body has a continuous cylindrical outer surface of constant radius.

12. A connector according to claim 1, wherein the connector is moulded from a non-opaque plastic.

13. A fibre optic cable connector, the connector comprising a connector body made of a non-opaque plastic, the connector body defining a through bore and having a connector at either end for connection to a tube;
    the outer face of the connector body being devoid of ribs;
    wherein each end of the connector receives an O-ring to seal with a respective tube inserted into a respective end of the connector, the O-rings being spaced from a central transparent portion of the connector.

14. A connector according to claim 13, wherein the connector body made of non-opaque plastic is configured such that part of the through bore is visible, in use, from outside the connector body when respective tubes are connected in place.

15. A connector according to claim 13, wherein respective connectors are received within each end of the connector body.

16. A connector according to claim 13, wherein an annular flange protrudes into the through bore to provide an end stop for respective tubes.

17. A connector according to claim 16, wherein the through bore is visible, in use, through the annular flange.

18. A connector according to claim 13, wherein at least the axially central third of the connector body has a continuous cylindrical outer surface of constant radius.

19. A connector according to claim 18, wherein substantially all of a length of the connector body has a continuous cylindrical outer surface of constant radius.

20. A fibre optic cable connector, the fibre optic cable connector comprising a connector body with an axial through bore defining an axis and having a connector at either end for connection of a respective tube at each end;
an annular flange of the connector body extending radially into the through bore, each end face of the annular flange providing a stop surface for a respective tube end, wherein the annular flange is undercut such that the annular flange is inclined so that the axial dimension of the annular flange increases towards the axis.

21. A connector according to claim 20, wherein an interface with the annular flange and the connector body is radiused to provide a curved transition.

22. A connector according to claim 20, wherein innermost corners of the annular flange are radiused to provide a curved transition.

23. A connector according to claim 20, wherein an inner diameter of the annular flange of the connector body is smaller than an inner diameter of the respective tube, in use, inserted into the connector and the connector body.

24. A combination of a tube and a connector according to claim 23, wherein the inner diameter of the annular flange is smaller than the inner diameter of the tube inserted into the connector.

25. A connector according to claim 20, wherein a plurality of axial splines are provided in a vicinity of the annular flange to deflect an outer wall of the tube as it approaches the annular flange.

26. A connector according to claim 25, wherein a thickness of the plurality of axial splines increases towards the annular flange.

27. A connector according to claim 20, wherein the body comprises an outer sleeve and an inner sleeve, the inner sleeve being configure to receive a distal end of a respective tube; an outer wall of the inner sleeve being generally spaced from an inner wall of the outer sleeve to define an air gap, the inner sleeve being supported on the outer sleeve by a discrete web of material which supports the inner sleeve and maintains the air gap between the inner and outer sleeve.

28. A connector according to claim 20, wherein an outer face of the connector body is devoid of ribs.

29. A connector according to claim 20, wherein the connector body is moulded from a non-opaque plastic.

30. A connector according to claim 20, wherein each end face of the annular flange is undercut.

31. A connector according to claim 20, wherein the annular flange is moulded integrally with the connector body.

32. A fibre optic cable connector, the connector comprising a connector body with an axial through bore defining an axis and having a connector at either end for connection of a respective tube at each end;
an annular flange extending radially into the through bore, each end face of the annular flange providing a stop surface for a respective tube end; and
a plurality of axial splines on a wall of the through bore in a vicinity of the annular flange, to deflect an outer wall of the respective tube as the respective tube approaches the annular flange.

33. A connector according to claim 32, wherein an interface with the annular flange and the connector body is radiused to provide a curved transition.

34. A connector according to claim 32, wherein innermost corners of the annular flange are radiused to provide a curved transition.

35. A connector according to claim 32, wherein an inner diameter of the annular flange is smaller than an inner diameter of the respective tube, in use, inserted into the connector.

36. A connector according to claim 32, wherein a thickness of the plurality of axial splines increases towards the annular flange.

37. A connector according to claim 32, wherein the connector body comprises an outer sleeve and an inner sleeve, the inner sleeve being configure to receive a distal end of a respective tube; an outer wall of the inner sleeve being generally spaced from an inner wall of the outer sleeve to define an air gap, the inner sleeve being supported on the outer sleeve by a discrete web of material which supports the inner sleeve and maintains the air gap between the inner and outer sleeve.

38. A connector according to claim 37, wherein there are a plurality of webs which support the inner sleeve.

39. A connector according to claim 37, wherein the discrete web of material is axially offset from the annular flange.

40. A connector according to claim 32, wherein an outer face of the connector body is devoid of ribs.

41. A connector according to claim 32, wherein the connector body is moulded from a non-opaque plastic.

* * * * *